United States Patent
Ward et al.

(10) Patent No.: US 9,292,234 B2
(45) Date of Patent: Mar. 22, 2016

(54) PRINT JOB CORRECTION MECHANISM

(71) Applicants: David Ward, Broomfield, CO (US);
Alexandru-Virgil Panek, Ghiroda (RO);
Charles D. Johnson, Boulder, CO (US)

(72) Inventors: David Ward, Broomfield, CO (US);
Alexandru-Virgil Panek, Ghiroda (RO);
Charles D. Johnson, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/070,834

(22) Filed: Nov. 4, 2013

(65) Prior Publication Data
US 2015/0124284 A1    May 7, 2015

(51) Int. Cl.
*G06F 3/12*    (2006.01)

(52) U.S. Cl.
CPC ............. *G06F 3/1205* (2013.01); *G06F 3/121* (2013.01); *G06F 3/1224* (2013.01); *G06F 3/1255* (2013.01); *G06F 3/1284* (2013.01); *G06F 3/1285* (2013.01); *G06F 3/1204* (2013.01)

(58) Field of Classification Search
None
See application file for complete search history.

(56) References Cited

U.S. PATENT DOCUMENTS

| | | | |
|---|---|---|---|
| 5,436,730 A * | 7/1995 | Hube | G06F 3/1297 358/1.16 |
| 7,522,299 B2 | 4/2009 | Nguyen | |
| 7,965,402 B2 | 6/2011 | Saito | |
| 8,270,007 B2 | 9/2012 | Pandit | |
| 2005/0254850 A1* | 11/2005 | Bardolatzy | G03G 15/00 399/81 |
| 2008/0170254 A1* | 7/2008 | Shah | G06F 3/1204 358/1.15 |
| 2009/0103128 A1* | 4/2009 | Maeda | G06F 3/1296 358/1.15 |
| 2009/0262395 A1* | 10/2009 | Kanamoto | G06F 3/1205 358/1.15 |
| 2009/0268228 A1* | 10/2009 | Lankreijer | G06F 21/31 358/1.14 |
| 2010/0245884 A1 | 9/2010 | Komine | |
| 2012/0198384 A1 | 8/2012 | Kumamoto | |
| 2012/0224207 A1 | 9/2012 | Sueshige | |

FOREIGN PATENT DOCUMENTS

WO    WO-00/68817    11/2000

OTHER PUBLICATIONS

European Search Report for EP Counterpart Application No. 14190773.3, 7 pgs., (Mar. 31, 2015).

* cited by examiner

*Primary Examiner* — Marcus T Riley
(74) *Attorney, Agent, or Firm* — Blakely, Sokoloff, Taylor & Zafman LLP

(57) ABSTRACT

A method is disclosed. The method includes receiving print job data at a printing system, performing constraint checking of the print job data to detect one or more invalid print requirements and applying corrective actions upon detecting one or more invalid print requirements in order to facilitate printing of the print job data.

12 Claims, 4 Drawing Sheets

Rules file syntax:
10: NUp != 2 && NupFinishingOrder != RP_ORDER_NORMAL;

CVC3 file syntax:
```
%----------------
%% symbolic constants
%----------------
RP_ORDER_NORMAL : INT = 0;
%----------------
%% keys/variables
%----------------
v00_NUp : INT;
v00_NupFinishingOrder : INT;
%----------------
%% rules
%----------------
R_0010 : BOOLEAN = (v00_NUp /= 2) AND (v00_NupFinishingOrder /= RP_ORDER_NORMAL);
```

C++ output:
```
//...
Job_JTAKeys::Job_JTAKeys(JTA_ObjBase *jtaObj):
jtaObj(jtaObj)
{
// get the override item pointers
JTAKeyInit(NUp, JTA_NUP, JTA_NUP);
JTAKeyInit(NupFinishingOrder, JTA_NupFinishingOrder,
JTA_NUP_FINISHING_ORDER);
}
//...
OBJ_BEGIN (Job, g)
{
Job_JTAKeys g(jtaObj); // "Job" keys
if ((g.NUp != 2) && (g.NupFinishingOrder !=
(int)RP_ORDER_NORMAL))
{
or_ruleIds.insert(10);
}
}OBJ_END (Job)
```

Figure 2

PRINT JOB CORRECTION MECHANISM

FIELD OF THE INVENTION

The invention relates to the field of printing systems, and in particular, to providing corrective actions to print jobs produced at a printing system.

BACKGROUND

In the field of printing, users prefer systems that allow for flexible processing of print jobs. Print jobs typically comprise print data (e.g., the data used to generate a printed output) as well as a job ticket. The job ticket includes attributes that assist in defining processing steps that may be performed for the print job. However, some attributes included in the job ticket may not be compatible with the printer capabilities. In such instances the printer may be forced to abort the job.

Accordingly, a recovery mechanism to enable the printer to provide corrective actions to print the job is desired.

SUMMARY

In one embodiment, a method is disclosed. The method includes receiving print job data at a printing system, performing constraint checking of the print job data to detect one or more invalid print requirements and applying corrective actions upon detecting one or more invalid print requirements in order to facilitate printing of the print job data.

BRIEF DESCRIPTION OF THE DRAWINGS

A better understanding of the present invention can be obtained from the following detailed description in conjunction with the following drawings, in which:

FIG. 2 illustrates embodiments of programming code;

DETAILED DESCRIPTION

A mechanism for performing corrective actions for a print job is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
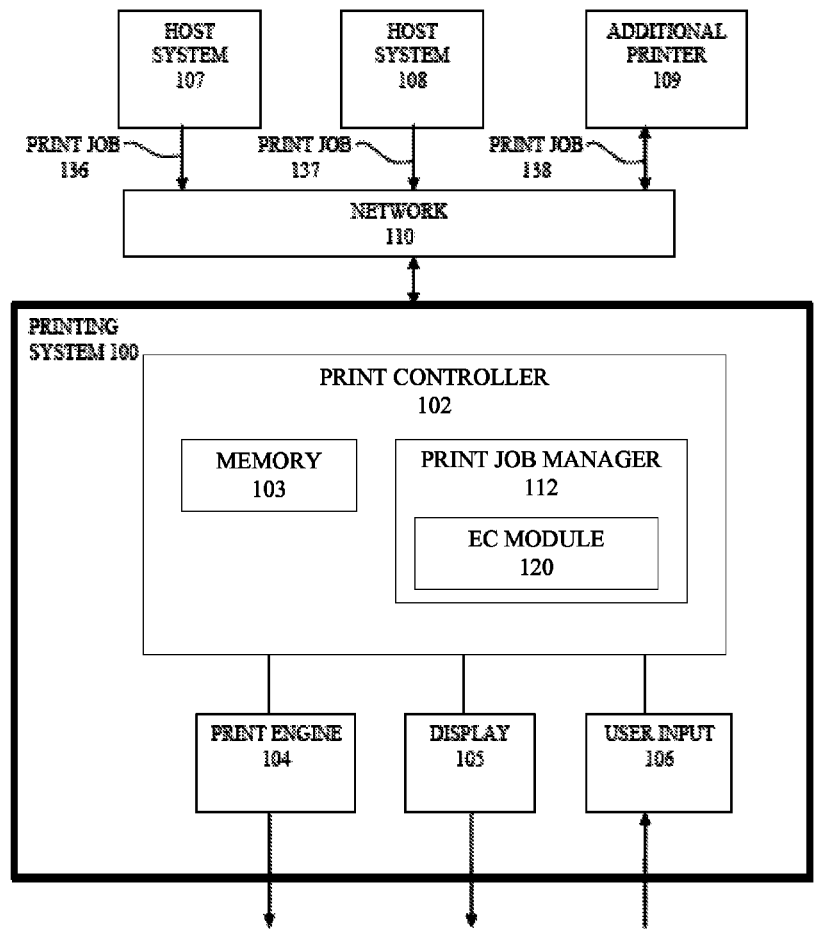
FIG. 1 illustrates one embodiment of a printing system.

FIG. 1 is a block diagram illustrating one embodiment of a printing system 100. Printing system 100 is a system used to provide marks on a media, such as a continuous forms printer or a cut sheet page printer. Printing system 100 may include any digital hardcopy output device, such as printers, copiers, multifunction printers (MFP's) and facsimiles.

In one embodiment, printing system 100 is shared by multiple users. In such an embodiment, printing system 100 includes a print controller 102 and one or more print engines 104. Print controller 102 includes any system, server, or components operable to interface one or more host systems 107 and 108, and a printer 109, via network 110 with one or more print engines 104, and to control the printing of print jobs 136-138 received from the host systems 107 and 108, and a printer 109, respectively, on print engine 104. Print engine 104 provides an imaging process to mark a printable medium, such as paper.

According to one embodiment, print controller 102 includes memory 103 and a print job manager 112. Memory 103 includes any storage system operable to store data. In one embodiment, print job manager 112 manages the printing of documents at printing system 100. Particularly, print job manager 112 controls print jobs as they wait to print, arranges the priority of the print jobs, generates separator pages and distributes jobs to the destination print engine 104. In one embodiment, print job manager 112 may be implemented using either InfoPrint Manager (IPM) or InfoPrint Process-Director (IPPD), although other types of print job managers may be used instead.

In one embodiment, print job manager 112 holds received print jobs in memory 103 before processing the print job. In such an embodiment, memory 103 stores the print jobs as either a data file or rasterized file. For example, print jobs stored as rasterized files reduce print time for the held jobs versus those stored as data files. Once stored, each print job may be held until the user that generated the print job retrieves the corresponding document from printing system 100, at which time the print job is processed and printed.

In a further embodiment, a user may release a selected job for printing at printing system 100 via user input 106. Printing system 100 thereby processes the print job by printing via print engine 104. In still a further embodiment, multiple selected print jobs being held for a particular user may be simultaneously processed and printed at print engine 104. Therefore, all print jobs for the same user are printed together when multiple print jobs are released to print.

According to one embodiment, print job manager 112 includes an error correction (EC) module 120 that is implemented to correct print job requirements. In one embodiment, the print job requirements are defined by a job ticket. However in other embodiments, the requirements are provided via other sources (e.g., graphical user interface (GUI)).

In another embodiment, EC module 120 automatically generates programming code implemented to perform constraint checking of a print job to detect invalid print requirements and apply the corrective actions to a print job to allow for the job to print successfully. In such an embodiment, a system operator (or user) implements user input 106 to specify whether corrective actions are to be applied upon detecting an attribute not supported by print controller 102.

According to one embodiment, EC module 120 determines the eligibility of a print job based on a set of conditions that are evaluated against a set of values (e.g., structured as a hierarchy of C++ objects) associated with the job. The conditions are referred to as rules, with each rule denoting a situation that would prevent a job from being successfully printed). In a first phase EC module 120 reads these rules from a text file provided by a user, verifies their consistency so that the rules won't contradict each other and generates C++ code that will evaluate the conditions at system runtime (e.g., second phase).

During the first phase, actions are provided for a given set of constraints that are determined by EC module 120. For example, a BOOKLET and 2Up pair may be required to print a booklet job successfully. Thus, the user can provide a corrective action if one of these attributes are not satisfied. Based on the above example, a selection is made between NORMAL and 4Up or BOOKLET and 2Up options for instances where a print job attribute is received indicating a BOOKLET and 4Up pair.

In one embodiment, the rules file uses syntax similar to the C/C++ expression syntax, with scanner and parser classes being used to read the rules file. Thus, rules in the rules file are specified in a declarative (or descriptive) manner. In a further embodiment, keywords used in the rule file are mapped to values of different types found in a hierarchy of C++ objects (e.g., attributes of the print job). Additionally, simple keyword types such as integers and strings are supported, while aggregated keyword types (such as vectors, records and type nesting) are also supported. Moreover, there is support for polymorphic aliases (e.g., shorthand for a keyword expression) in the rules file. An alias may be used in multiple contexts and the keywords may have different meanings.

According to one embodiment, everything that EC module 120 does not recognize based on static symbol tables is assumed to be defined in build headers (e.g., definitions or various symbolic constant that can be used freely in the rules file). In a further embodiment, a temporary C++ source is generated, compiled in the build tree, executed and its output is read back to EC module 120 since the actual types and values of these symbols are needed for verifying the rules' consistency. This is referred to as symbolic constants resolving.

In one embodiment, the rules' consistency is verified using an external program (e.g., a SMT theorem prover (CVC3) for which EC module 120 generates an intermediary file using the CVC3 syntax, starts the CVC3 program as a separate process and communicates with it using standard I/O pipes). In another embodiment, the C++ code generated by EC module 120 relies heavily on C++ templates that are humanly readable, concise and efficient. In yet another embodiment, EC module 120 supports fixing job attributes automatically so that the printing of an ineligible job may be forced. FIG. 2 illustrates exemplary programming code embodiments of rules file syntax, CVC3 file syntax and C++ output. It should be appreciated C++ is merely exemplary and other object-oriented (e.g., Java) or non-object oriented programming languages (e.g., C) could be used.

In one embodiment, the first phase is performed once during a system build, while the second phase is invoked multiple times for different print jobs during the regular print job processing. During the second phase print controller 102 utilizes the corrective actions to automatically construct code to handle print jobs with errors.

Figure 3:
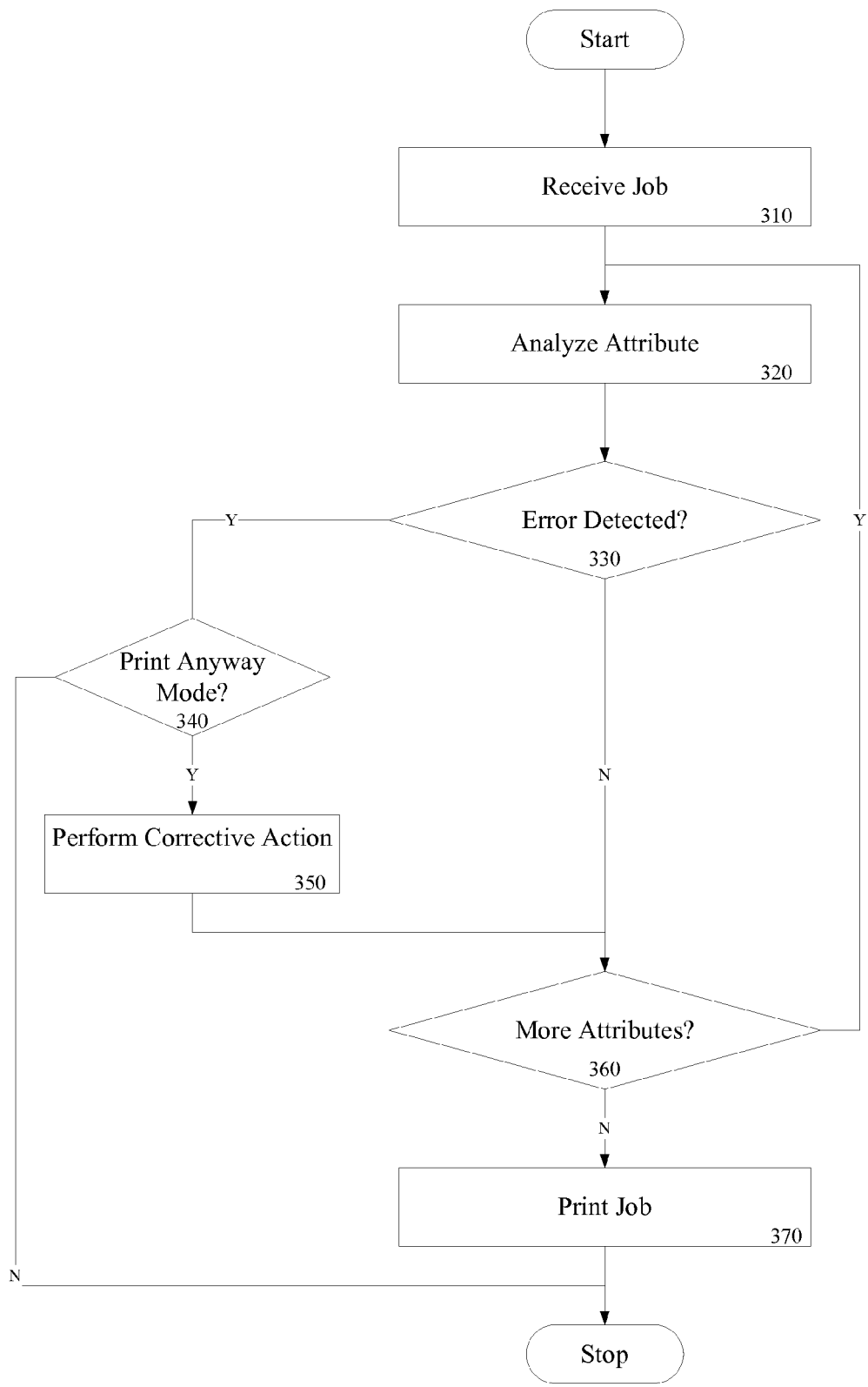
FIG. 3 is a flow diagram illustrating one embodiment of performing corrective actions for a print job.

FIG. 3 is a flow diagram illustrating one embodiment of operation during performing the second phase. At processing block 310, a print job is received at print controller 102 for print processing. At processing block 320, an ineligibility situation (rule) included in the print job, or an accompanying job ticket, is analyzed at EC module 120. In one embodiment, a rule is denoted by an expression that involves a set of one or more attributes. At decision block 330, it is determined whether an error is detected (e.g., the attribute is satisfied).

If an error is detected, a determination is made as to whether print controller 102 is operating in a print anyway mode, decision block 340. In one embodiment, the print anyway mode enables continued print processing of the job even if one or more attribute errors are detected. Thus, corrective actions are performed on a set of one or more attributes to facilitate successful printing of the job, processing block 350. If not operating in the print anyway mode, print controller 102 aborts the job.

If no error is detected at decision block 330, or corrective action has been performed at processing block 350, it is determined whether the job includes additional attributes to analyze, decision block 360. If there are additional attributes to analyze, control is returned to processing block 320 where the next attribute included in the print job is analyzed. Otherwise, the job is further processed and printed, processing block 370.

Figure 4:
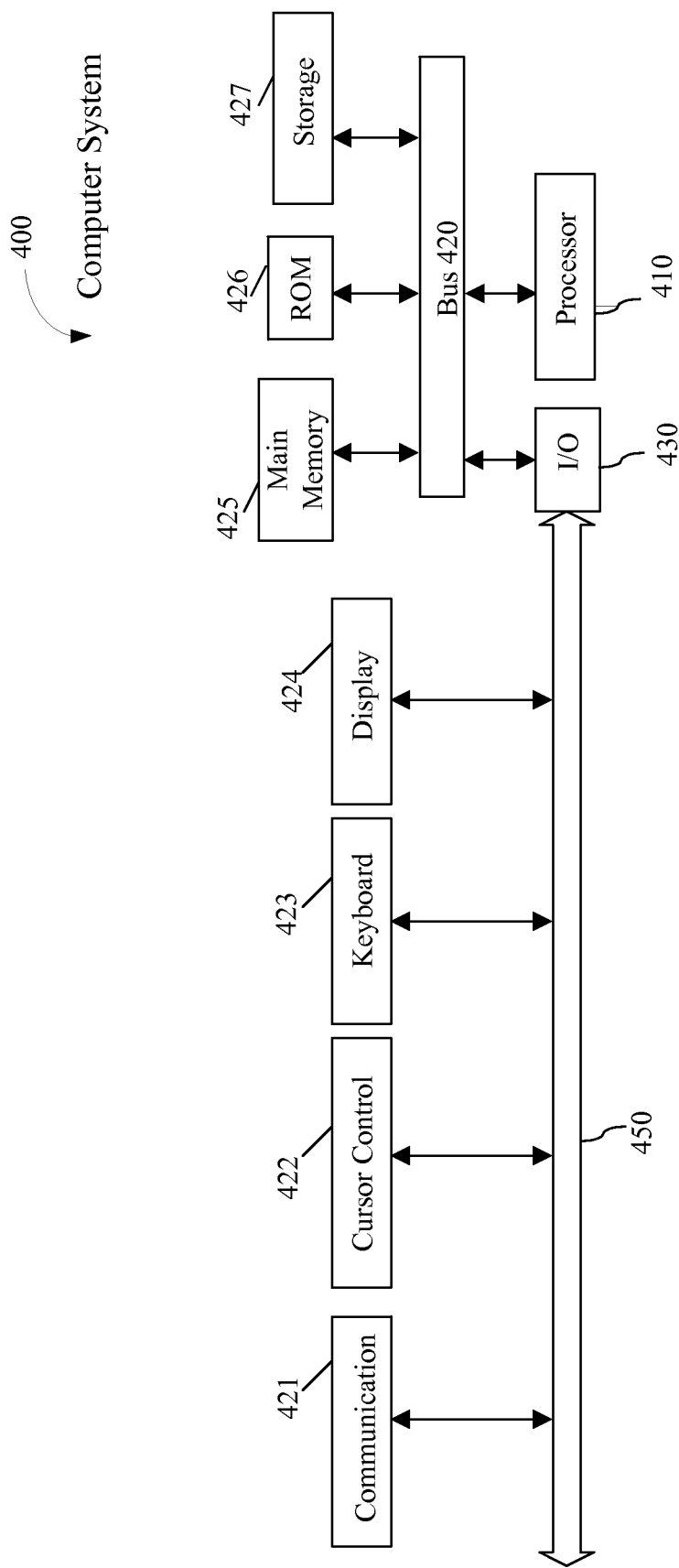
FIG. 4 illustrates one embodiment of a computer system.

FIG. 4 illustrates a computer system 400 on which printing system 100 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

A portion of the disclosure of this patent document includes material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
    receiving a rules file including a set of rules indicating conditions that prevent a print job from printing;
    receiving print job data at a printing system;
    evaluating one or more attributes in the print job data against rules included in the print job data to determine if the one or more attributes in the print job data can be satisfied at the printing system;
    applying a first corrective action to automatically generate first programming code to replace a first attribute with a second attribute upon detecting that the first attribute cannot be satisfied; and
    applying a second corrective action to automatically generate second programming code to replace a third attribute with a fourth attribute upon detecting the third attribute cannot be satisfied.

2. The article of manufacture of claim 1 further comprising:
    determining if an error is detected for the one or more attributes.

3. The article of manufacture of claim 1 further comprising determining if the printing system is operating in a print anyway mode.

4. The article of manufacture of claim 3 including data that, when accessed by a machine, further cause the machine to perform operations comprising:
    applying a corrective action if the printing system is operating in the print anyway mode; and
    aborting printing of the print job data if the printing system is not operating in the print anyway mode.

5. The article of manufacture of claim 1 wherein the corrective actions are automatically generated.

6. The article of manufacture of claim 1 wherein the rules are included in a text file and are verified for consistency to prevent rule contradiction.

7. The article of manufacture of claim 5 wherein the corrective actions are automatically generated as programming code.

8. A printing system comprising:
    a storage device;
    a print job manager to store received print jobs in the storage device; and
    an error correction (EC) module having a rules file including a set of rules indicating conditions that prevent a print job from printing, to evaluate one or more attributes in the print jobe data against rules included in the print job data to determine if the one or more attributes in the print job data can be satisfied at the printing system, apply a first corrective action to automatically generate first programming code to replace a first attribute with a second attribute upon detecting that the first attribute cannot be satisfied and apply a second corrective action to automatically generate second programming code to replace a third attribute with a fourth attribute upon detecting the third attribute cannot be satisfied.

9. The printing system of claim 8 wherein the EC module determines if an error is detected for the attribute.

10. The printing system of claim 9 the EC module further determines if the printing system is operating in a print anyway mode.

11. The printing system of claim 10 wherein the EC module applies a corrective action if the printing system is operating in the print anyway mode and aborting printing of the print job data if the printing system is not operating in the print anyway mode.

12. The printing system of claim 8 wherein the EC module verifies rules included in a text file for consistency to prevent rule contradiction.

* * * * *